United States Patent
Evans et al.

(10) Patent No.: US 8,780,778 B2
(45) Date of Patent: Jul. 15, 2014

(54) SYSTEM AND METHOD FOR PROVIDING SYNCHRONIZED BROADCAST AND SIMULCAST OF MEDIA CONTENT

(75) Inventors: Greg M. Evans, Raleigh, NC (US); Eugene Matthew Farrelly, Cary, NC (US); Andrew V. Phillips, Raleigh, NC (US)

(73) Assignee: Lemi Technology, LLC, Wilmington, DE (US)

( * ) Notice: Subject to any disclaimer, the term of this patent is extended or adjusted under 35 U.S.C. 154(b) by 365 days.

(21) Appl. No.: 12/801,566

(22) Filed: Jun. 15, 2010

(65) Prior Publication Data

US 2012/0051543 A1    Mar. 1, 2012

Related U.S. Application Data

(60) Provisional application No. 61/227,196, filed on Jul. 21, 2009.

(51) Int. Cl.
*H04H 20/71* (2008.01)

(52) U.S. Cl.
USPC ........................................ 370/312

(58) Field of Classification Search
USPC ......... 370/203, 204–215, 216–228, 229–240, 370/241–253, 254–271, 310–337, 338–350, 370/395.3, 395.4, 395.41, 395.42, 395.5, 370/395.52, 431–457, 458–463, 464–497, 370/498–522, 523–520, 521–529, 717, 725
See application file for complete search history.

(56) References Cited

U.S. PATENT DOCUMENTS

| | | | | |
|---|---|---|---|---|
| 6,018,768 | A | * | 1/2000 | Ullman et al. ............... 709/218 |
| 6,351,736 | B1 | | 2/2002 | Weisberg et al. |
| 6,816,966 | B1 | * | 11/2004 | Gupta et al. .................. 713/163 |
| 6,832,388 | B1 | * | 12/2004 | Du Val .......................... 725/110 |
| 7,086,081 | B2 | | 8/2006 | Martinez et al. |
| 7,236,208 | B2 | * | 6/2007 | Eaton et al. .................... 348/553 |
| 7,308,485 | B2 | | 12/2007 | Roberts et al. |
| 8,023,439 | B2 | * | 9/2011 | Rao ............................... 370/310 |
| 8,141,115 | B2 | * | 3/2012 | Wohlert et al. ................. 725/48 |
| 2002/0162121 | A1 | | 10/2002 | Mitchell |
| 2003/0115167 | A1 | | 6/2003 | Sharif et al. |
| 2005/0059409 | A1 | * | 3/2005 | Vare et al. .................. 455/456.1 |
| 2006/0174348 | A1 | | 8/2006 | Rhoads et al. |
| 2006/0239266 | A1 | * | 10/2006 | Babbar et al. ................. 370/392 |
| 2007/0169115 | A1 | * | 7/2007 | Ko et al. ........................ 717/174 |
| 2008/0129864 | A1 | * | 6/2008 | Stone et al. .................... 348/468 |
| 2009/0005019 | A1 | * | 1/2009 | Patel et al. .................. 455/414.2 |
| 2009/0059962 | A1 | * | 3/2009 | Schmidt et al. ............... 370/503 |
| 2009/0089842 | A1 | * | 4/2009 | Perry et al. ...................... 725/78 |
| 2009/0111448 | A1 | | 4/2009 | Paila |

(Continued)

OTHER PUBLICATIONS

"3GPP," Wikipedia, at <http://en.wikipedia.org/wiki/3GPP>, as revised Mar. 27, 2008, printed Dec. 12, 2011, 1 page.

(Continued)

*Primary Examiner* — Jung-Jen Liu (57) ABSTRACT

A system and method of receiving a radio broadcast and simulcast of media content, including: receiving a digital radio broadcast comprising digital radio content over a terrestrial radio broadcast spectrum; receiving media content separately over a multicast network; time synchronizing the media content to the digital radio broadcast; and presenting the time synchronized media content and the digital radio content for playback by a client device. Other embodiments are disclosed.

31 Claims, 8 Drawing Sheets

(56) References Cited

U.S. PATENT DOCUMENTS

| | | | | |
|---|---|---|---|---|
| 2009/0157613 | A1* | 6/2009 | Strohmenger et al. | 707/3 |
| 2009/0180451 | A1* | 7/2009 | Alpert et al. | 370/338 |
| 2009/0205008 | A1* | 8/2009 | Wollmershauser et al. | 725/131 |
| 2009/0276821 | A1* | 11/2009 | Amento et al. | 725/116 |
| 2009/0323646 | A1* | 12/2009 | Ketchum et al. | 370/338 |
| 2010/0138561 | A1* | 6/2010 | Church | 709/248 |
| 2010/0169751 | A1* | 7/2010 | Sun et al. | 714/807 |
| 2011/0107364 | A1* | 5/2011 | Lajoie et al. | 725/25 |
| 2011/0107379 | A1* | 5/2011 | Lajoie et al. | 725/87 |
| 2011/0131411 | A1* | 6/2011 | Lin et al. | 713/168 |
| 2012/0051543 | A1* | 3/2012 | Evans et al. | 380/270 |

OTHER PUBLICATIONS

"Application-specific integrated circuit," Wikipedia, at <http://en.wikipedia.org/wiki/Application-specific_integrated_circuit> as revised May 10, 2009, printed Dec. 13, 2011, 7 pages.

"Internet radio," Wikipedia, at <http://en.wikipedia.org/wiki/Internet_radio> as revised on May 16, 2009, printed Dec. 13, 2011, 6 pages.

"IPv6," Wikipedia, at <http://en.wikipedia.org/wiki/IPv6>, page last modified Apr. 18, 2011, printed Apr. 21, 2011, 16 pages.

"Multicast," Wikipedia, at <http://en.wikipedia.org/wiki/Multicast>, page last modified Mar. 26, 2011, printed Apr. 21, 2011, 5 pages.

"Radio Data System," Wikipedia, at <http://en.wikipedia.org/wiki/Radio_Data_System> as revised May 18, 2009, printed Dec. 13, 2011, 7 pages.

"Samsung's New See'N'Search Set-Top Box Revolutionizes How Consumers Access the Internet," BusinessWire, Ridgefield Park, NJ, Feb. 13, 2008, at <http://www.businesswire.com/portal/site/home/?epi_menuItemID=85 . . . >, printed Mar. 5, 2008, 2 pages.

"Wi-Fi," Wikipedia, at <http://en.wikipedia.org/wiki/Wi-Fi> as revised May 28, 2009, printed Dec. 13, 2011, 10 pages.

Concert Technology; Terrestrial to Internet Radio's Big Opportunity; Dec. 1, 2008; Version 1.0; www.concerttechnology.com.

NAVTEQ; NAVTEQ Dynamic Content Delivery for HD Radio (TM) Systems Unveiled in North America; LBS Zone; Apr. 20, 2009; www.lbszone.com/content/view/4900/2/.

* cited by examiner

FIG. 1A

| Morning Playlist 8:00am-8:30am | | | | | |
|---|---|---|---|---|---|
| | | | Video Ads | | |
| Time | Song | Artist | Location 1 Knoxville | Location 2 Oak Ridge | Location 3 Seymour |
| 8:00:00 | Fantasy | Earth, Wind & Fire | Univ of TN | Debt Specialists | Seymour Health Professionals |
| 8:04:30 | Takin' it to the Streets | Doobie Brothers | First TN Bank | Subway | Inner Beauty Day Spa |
| 8:08:57 | Time Out of Mind | Steely Dan | Advantage Care | Kids First Day Care | Red Robin |
| 8:12:15 | Spinning Wheel | Blood, Sweat & Tears | Countrywide Homes | Bull Tire | Wal-mart |
| 8:16:37 | Lowdown | Boz Scaggs | Ruth's Chris | Target | Jiffy Lube |
| 8:19:42 | Fanny (Be Tender ...) | Bee Gees | H&R Block | Avis Rent-A-Car | China One Restaurant |
| 8:24:17 | Midnight Rider | The Allman Brothers Band | WBIR NBC Affiliate | Rush Fitness Center | Food Factory |
| 8:27:02 | Colour My World | Chicago | West Town Mall | Oak Ridge Bowling Center | Best Buy |
| 8:30:00 | Dream On | Aerosmith | Knoxville Zoo | Sylvan Learning Center | DirecTV |

SYSTEM AND METHOD FOR PROVIDING SYNCHRONIZED BROADCAST AND SIMULCAST OF MEDIA CONTENT

CROSS REFERENCE TO RELATED APPLICATIONS

The present application claims priority from U.S. Provisional Application No. 61/227,196 filed on Jul. 21, 2009, the disclosure of which is incorporated herein by reference in its entirety.

FIELD OF THE INVENTION

The present disclosure relates generally to a media system and, more particularly, to a system and method for providing synchronized terrestrial broadcast and Internet simulcast of media content.

BACKGROUND OF THE INVENTION

Listeners to Internet Radio have become accustomed to a minimal amount of audio advertising (ads) in Internet Radio content streams. Listeners of Internet Radio would like to access Internet Radio in a mobile environment, but Internet Radio may have a significant bandwidth usage impact on future 4G mobile services. Terrestrial HD broadcasts are more suited for the mobile environment from a bandwidth perspective, but unfortunately, existing Terrestrial HD broadcast business models do not support a minimal amount of audio ads. Thus, it would be beneficial to provide next-generation devices which are capable of supporting enhanced data bandwidth over the latest generation of cellular wireless standards infrastructures (e.g., 4G infrastructures, including for example, Long Term Evolution (LTE™) or Worldwide Interoperability for Microwave Access (WiMAX™) networks, which can be Internet Protocol version 6 (IPv6) enabled) in addition to HD Radio tuners and associated radio data system (RDS) functionality, such that Mobile HD radio listeners may then be provided with an experience comparable to Internet Radio.

SUMMARY OF THE INVENTION

Systems and methods consistent with the present disclosure relate to utilizing the next-generation Internet Protocol version 6 (IPv6) capabilities of 4G (and similar) networks to provide multicast time synchronized geo-relevant content matched to a given digital radio broadcast, such as an HD Radio station's terrestrial broadcast. This synchronized broadcast and simulcast capability then allows mobile client devices to use radio data system (RDS) geo-coded tags with their global positioning system (GPS) identified location to join an appropriate multicast for targeted media content (e.g., video or audio) capability (to provide targeted ads, for example).

Moreover, systems and methods consistent with the present disclosure provide for an acknowledgement such as, for example, an autonomous unicast message to be sent from the client to confirm media content placement and record HD Radio song playback for centralized royalty calculations.

Moreover, systems and methods consistent with the present disclosure allow for control of access to encrypted terrestrial broadcast audio content using, for example, a client side watermark reader for extracting an encryption key from the watermark of a selected multicast video to decrypt the audio content for playback together with the media content by the client device.

According to one aspect, the present disclosure provides a method of receiving a radio broadcast and simulcast of media content, including: receiving a digital radio broadcast comprising digital radio content over a terrestrial radio broadcast spectrum; receiving media content separately over a multicast Internet Protocol (IP) network; time synchronizing the media content to the digital radio broadcast; and presenting the time synchronized media content and the digital radio content for playback by a client device.

In the method, the media content may be one of a video multicast or an audio multicast.

According to another aspect of the present disclosure, a system is provided for providing synchronized broadcast and simulcast of media content, including: a frequency modulation (FM) transmitter which transmits a digital radio broadcast comprising digital radio content over a terrestrial radio broadcast spectrum; a simulcast content streaming function which transmits media content separately over a multicast network; a microcontroller which time synchronizes the media content to the digital radio broadcast; and a media codec which presents the time synchronized media content and the digital radio content for playback by a client device.

The present disclosure also contemplates a non-transitory, computer readable medium including a program for instructing a client device to: receive a digital radio broadcast comprising digital radio content over a terrestrial radio broadcast spectrum; receive media content separately over a multicast network; time synchronize the media content to the digital radio broadcast; and present the time synchronized media content and the digital radio content for playback.

The present disclosure also contemplates a method operating in a client device, including: receiving a digital radio broadcast from a terrestrial radio station along with an associated radio data system (RDS) functionality; receiving media content separately over a multicast network; receiving multicast Internet Protocol (IP) addresses matched to a geo-tag for each item of the media content from an RDS channel of the digital radio broadcast; receiving at least one global positioning system signal for providing location coordinates to identify a current location of the client device; analyzing the current location and selecting an optimum multicast based on the geo-tagged IP address of the selected multicast; and concurrently displaying the media content of the selected multicast together with playback of the digital radio broadcast on the client device.

The present disclosure also contemplates that audio content of the digital radio broadcast from the terrestrial radio station may be encrypted, the method further including extracting an encryption key from the selected multicast to decrypt the audio content for playback together with the media content by the client device.

The present disclosure also contemplates that once decryption is enabled and the media content is displayed by the client device, the method further including returning an acknowledgement confirming that the selected multicast was joined.

The present disclosure also contemplates a client device comprising a controller to: receive a digital radio broadcast from a terrestrial radio station along with an associated radio data system (RDS) functionality; receive media content separately over a multicast network; receive multicast Internet Protocol (IP) addresses matched to a geo-tag for each item of the media content from an RDS channel of the digital radio broadcast; receive at least one global positioning system signal for providing location coordinates to identify a current location of the client device; analyze the current location and select an optimum multicast based on the geo-tagged Internet Protocol (IP) address of the selected multicast; and concurrently display the media content of the selected multicast together with playback of the digital radio broadcast on the client device.

The present disclosure also contemplates a multicast network including a streaming server function for streaming media content, the streaming server function being operative to make location data and multicast IP addresses for each of a plurality of video feeds available to a radio data system (RDS) channel of a digital radio broadcast comprising digital radio content transmitted over a terrestrial radio broadcast spectrum, thereby to allow synchronization of the digital radio content with a selected video feed transmitted separately over the multicast network for time synchronized playback of the selected video feed and the digital radio content.

The present disclosure also contemplates a digital terrestrial broadcasting system, including: a frequency modulation (FM) transmitter which transmits a digital radio broadcast comprising digital radio content over a terrestrial radio broadcast spectrum; and a radio content programming function which sends in advance a playlist and a time that the playlist is to be broadcast to a simulcast content streaming function of a multicast network, thereby to allow synchronization of the digital radio content with media content transmitted separately over the multicast network for time synchronized playback of the media content and the digital radio content.

The present disclosure also contemplates a system for providing synchronized broadcast and simulcast of media content, including: a frequency modulation (FM) transmitter which transmits a digital radio broadcast comprising digital radio content over a terrestrial radio broadcast spectrum; a simulcast content streaming function which transmits media content separately over a multicast network; means for time synchronizing the media content to the digital radio broadcast; and means for presenting the time synchronized media content and the digital radio content for playback by a client device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Note that at times the system of the present invention is described as performing a certain function. However, one of ordinary skill in the art would know that the program is what is performing the function rather than the entity of the system itself. Further, embodiments described in the present disclosure can be implemented in hardware, software, or a combination thereof.

Although aspects of one implementation of the present invention are depicted as being stored in memory, one skilled in the art will appreciate that all or part of systems and methods consistent with the present disclosure may be stored on or read from other non-transitory, computer-readable media, such as secondary storage devices, like hard disks, floppy disks, and CD-ROM, or other forms of a read-only memory (ROM) or random access memory (RAM) either currently known or later developed. Further, although specific components of the system have been described, one skilled in the art will appreciate that a system suitable for use with the methods and systems consistent with the present disclosure may contain additional or different components.

As indicated above, systems and methods consistent with the present disclosure provide for synchronized broadcast and simulcast of media content. While an exemplary embodiment is discussed below in the context of a video multicast, one skilled in the art will appreciate that a system suitable for use with the methods and systems consistent with the present disclosure may be employed in other media context such as, but not limited to, an audio multicast solution.

A more detailed description of the systems and methods consistent with the present disclosure will now follow with reference to the accompanying drawings.

Figure 1A:
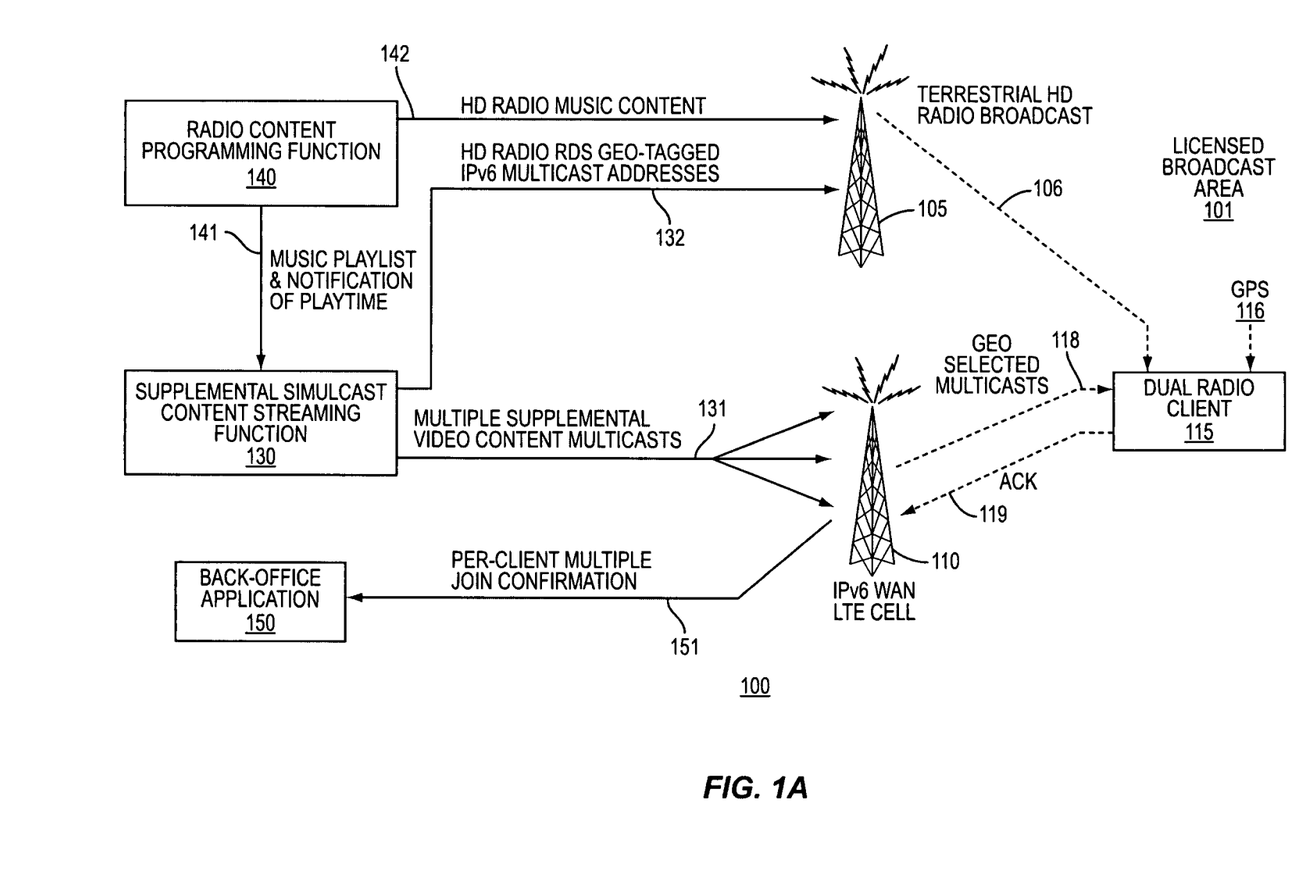
FIG. 1A illustrates an overview of a system for providing synchronized broadcast and simulcast of media content, including the basic function using an RDS trigger for geo-based media content support, according to an exemplary embodiment of the present disclosure.

FIG. 1A illustrates an overview of a system 100 for providing synchronized broadcast and simulcast of media content, including the basic function using an RDS trigger for geo-based media content support, according to an exemplary embodiment of the present disclosure. In this case, FIG. 1A shows the system 100 using a digital radio broadcast such as, but not limited to, HD Radio (including supplemental RDS broadcast) with Long Term Evolution (LTE™) multicast. For example, LTE™ Advanced for 4G is one example of an LTE™ network; however, the present invention is not limited to this and other suitable networks, such as 3G or 4G networks, or future developed networks may be used. Moreover, while FIG. 1A shows an LTE™ network as an example, the present invention contemplates any mobile data network that supports IPv6 multicast. LTE™ and WiMAX™ are examples of networks which can be IPv6 enabled.

In FIG. 1A, the system 100 comprises, for example, a dual physical layer system operating in a licensed broadcast area 101 wherein a terrestrial frequency modulation (FM) radio station 105 including an FM transmitter provides audio, such as a terrestrial HD Radio broadcast, over the traditional terrestrial radio broadcast spectrum and related location relevant video over a separate mobile Internet Protocol (IP) network 110 to a client playback device of a dual radio client 115. Multiple video feeds are available based on the client's location, where each feed provides location relevance to the presently transmitted audio. Associated geo-tags are broadcast with the terrestrial system identifying the IP addresses of these matching video feeds. The client playback device of the dual radio client 115 can then use GPS as at 116 to select and display the applicable video feed 118. Such a system 100 can provide video based location targeted ads matching to a given radio content such as, for example, a song being played on the terrestrial radio broadcast spectrum. The system 100 is well suited to next generation dual radio smart phone chipsets and supports 3G/4G mobile IP connectivity and HD Radio tuners with RDS capability. The multicast capability of an IPv6 mobile access network (such as LTE™ or WiMAX™) serves to increase the total delivery spectrum efficiency of the separate mobile Internet Protocol (IP) network 110 in the system 100.

At the transmit side, the supplemental simulcast content streaming function 130 streams multiple supplemental video content multicasts 131 over the mobile IP network 110, where each video stream is matched to location and the audio (e.g., a song) generated from a radio content programming function 140 (or previously defined playlist as at 141). The radio content programming function 140 also provides the radio content, such as HD Radio music content as at 142 for terrestrial radio broadcast from FM radio station or broadcast facility 105. Each location-targeted video is made available via a multicast IPv6 address allowing bandwidth to only be used when needed within a given mobile access network (shown in FIG. 1A as an LTE™ network) cell and preferably, but not necessarily, without being replicated with separate unicast feeds to multiple clients. The streaming function makes location data and multicast IP addresses for each video feed available to the RDS channel of the terrestrial broadcast as shown by the HD Radio RDS geo-tagged IPv6 multicast addresses 132. Client devices, such as dual radio client 115, receive the audio and RDS as at 106 from the terrestrial HD Radio broadcast of terrestrial FM radio station 105. The RDS geo-tags are matched to the current location using GPS 116 and the appropriate video multicast 118 is joined over the mobile access network (shown in FIG. 1A as an LTE™ network). Once the appropriate video multicast 118 has been joined, an acknowledgement 119 is returned from the dual radio client 115 to a back-office application 150 identifying and confirming which multicast was joined as at 151.

Figure 1B:
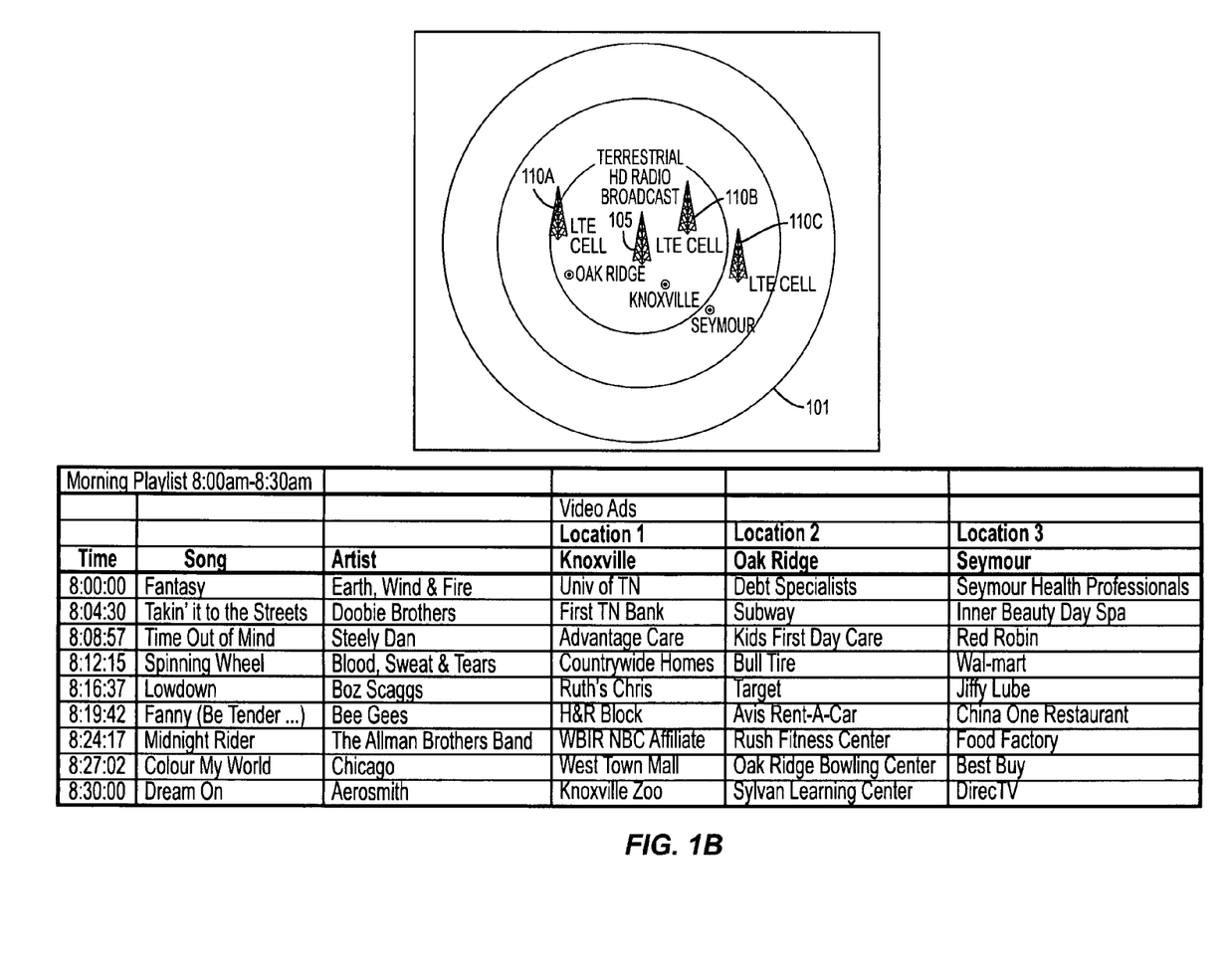
FIG. 1B illustrates a map and a playlist table to show an example of the system of FIG. 1A matching ads with a playlist and different geographic locations for broadcasting to those locations.

FIG. 1B illustrates a map and a playlist table to show an example of the system 100 of FIG. 1A matching ads with a playlist and different geographic locations for broadcasting to those locations. In addition to the terrestrial FM radio station 105, FIG. 1B shows a plurality of IP networks, for example, mobile access network cells 110A, 110B, and 110C (shown in FIG. 1B as LTE™ cells) positioned at different geographic locations in the broadcast area 101 which is represented in FIG. 1B by the concentric circles. More specifically, the radio content programming function 140 of terrestrial FM radio station 105 programs its playlist as it normally would. However, the radio content programming function 140 communicates the playlist and the time the playlist is to be broadcast to the supplemental simulcast content streaming function 130. The supplemental simulcast content streaming function 130 then matches media content (in this example, ads) with the playlist and different geographical locations and broadcasts it as shown in FIG. 1B. Ads can be selected by location according to the terms negotiated between the station and the advertiser. Alternatively, specific advertisers can request that their ads be displayed only against certain songs (and not with other songs). The supplemental simulcast content streaming function 130 preferably, but not necessarily, performs these tasks. The supplemental simulcast content streaming function 130 may also potentially modify and/or select the ads to match the timing data of the songs in the playlist. In the example of FIG. 1B, for the 8:30 am timeslot, the Knoxville Zoo ad, for example, is played while the listener is hearing the song "Dream On" by the group Aerosmith. As an example, the video ad may simply be a video showing different snapshots of families having fun at the Knoxville Zoo, displayed along with the Zoo hours and contact information. FIG. 1B also shows a variety of different songs and artists matched with various commercial enterprises at different locations for the particular timeslots between 8:00 am and 8:30 am.

Figure 2:
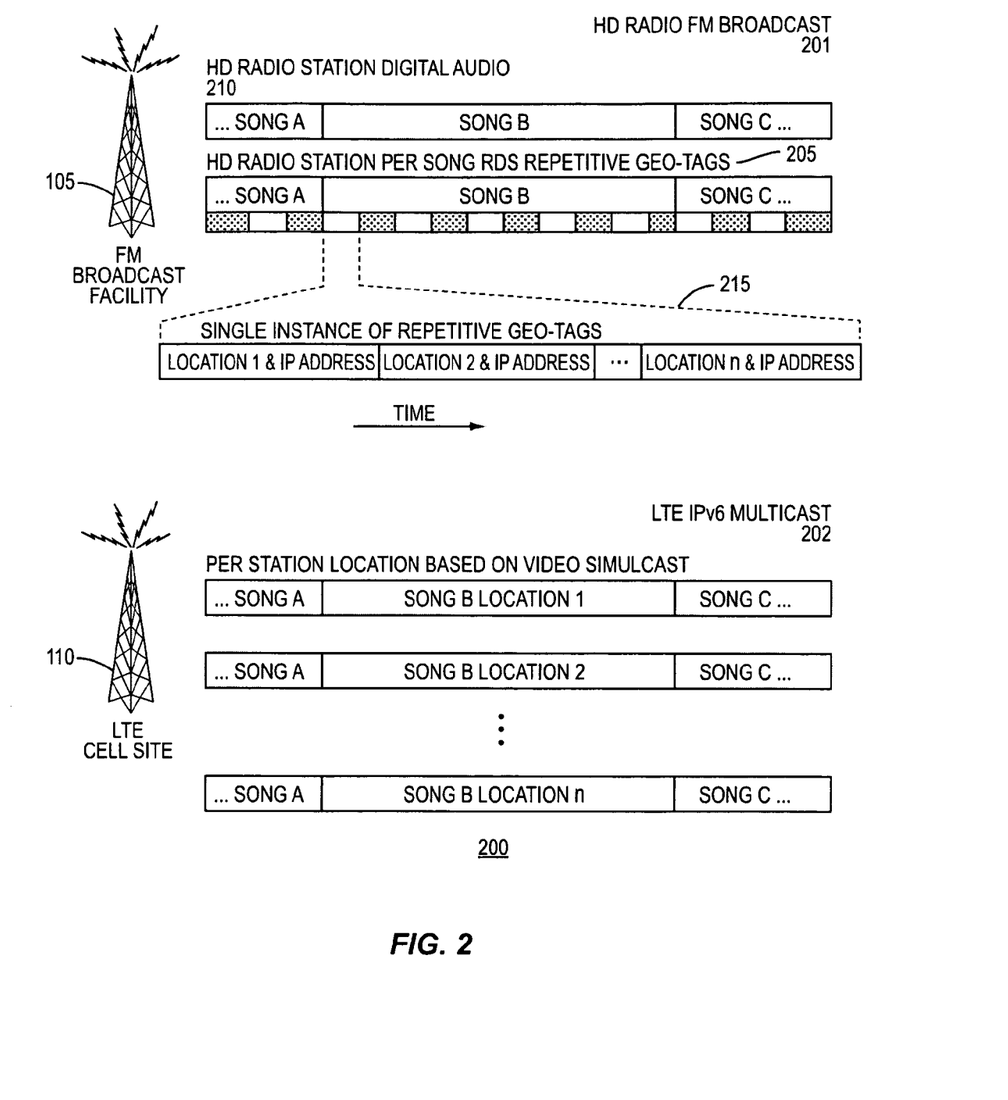
FIG. 2 depicts the basic protocol for geo-tagged audio and simulcast multicast of media content according to an illustrative embodiment.

The basic protocol formats 200 for geo-tagged audio and simulcast multicast video are shown in FIG. 2. The RDS capability allows a repetitive sequence of geo-tags 205 to be broadcast as at 201 from the FM broadcast facility 105 with, for example, the digital audio content 210 of the HD Radio station. The geo-tag sequence 205 repeats such that a client tuning to a station after the beginning of a song (e.g., songs A, B, C, . . . ) can quickly join the associated multicast 202. Each geo-tag 215 contains a point location or given area matched to an IPv6 multicast address (e.g., Location 1 & IP Address, Location 2 & IP Address, . . . . Location n & IP Address). The point location or given area may be defined as a single location with given radius, points of a polygon, or other area defining means. The IP address may be directly defined or indirectly defined using a uniform resource locator (URL) (via Hypertext Transfer Protocol (HTTP)). Differing Layer 4 through 7 protocol stack implementations may be used for delivering the video. The associated video streams available over the mobile access network (e.g., LTE™, WiMAX™, etc.) are time synchronized to the given song playing over the terrestrial broadcast (FIG. 2 shows song B as an example).

Figure 3:
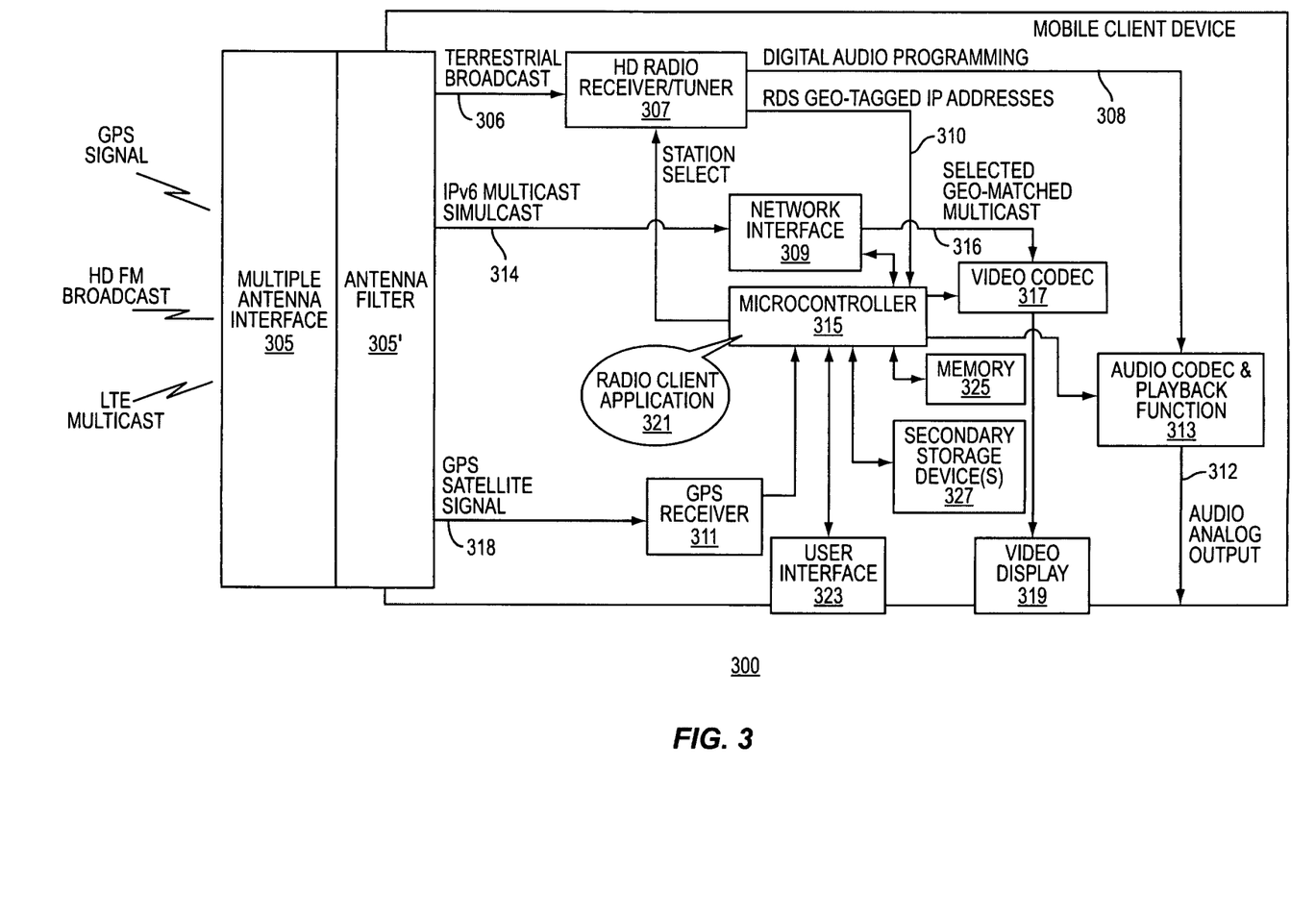
FIG. 3 depicts a block diagram of the basic functions of a client device according to an illustrative embodiment.

The basic functions of the client side device 300 (which corresponds to dual radio client 115 in FIG. 1) are shown in FIG. 3. The client side device 300 is described in the context of a mobile client device, but is not limited thereto. For example, the client side device 300 may be a smart phone, a laptop computer, a personal computer (PC), a digital audio player with Internet capability, or the like. The client side device 300 may be integrated with a mobile entertainment system such as, for example, an automobile entertainment system. A multiple antenna interface 305 receives HD FM radio broadcast, mobile access network multicast (shown in FIG. 3 as an LTE™ multicast), and a GPS signal. The multiple antenna interface 305 includes an antenna filter 305' which routes each of the signals to the appropriate processors in the client side device 300. Thus, the analog RF spectrum from the terrestrial broadcast is provided as shown at 306 for an HD Radio receiver/tuner 307, the multicast 314 is provided for a mobile IP network interface 309, and the GPS signal 318 is provided for a GPS receiver 311. The HD Radio receiver/tuner 307 demodulates to separate digital audio programming 308 and RDS geo-tags 310. The digital audio 308 is fed to an appropriate audio codec & playback functions 313 for decompression and audio analog conversion 312 as an output for the listener. The RDS geo-tags 310 are sent to a microcontroller 315. The GPS receiver 311 receives a GPS satellite signal 318 and provides longitude and latitude coordinates to the microcontroller 315 allowing identification of current location to a geo-tagged area from the RDS channel. The microcontroller 315 then uses the associated IP address to connect to the correct multicast 314 via the network interface 309. Thus, the microcontroller 315 serves as a means for time synchronizing the media content to the digital radio broadcast. The received multicast is then fed as at 316 to a video codec 317 for display on a video display 319 on the client side device 300. The audio codec & playback functions 313 and the video codec 317 together form a media codec and are included in a means for presenting the time synchronized media content and the digital radio content for playback by the client side device 300. A radio type client application 321 provides user interface 323 and other controls via the microcontroller 315. The radio type client application 321 can be, for example, pre-installed on client side device 300, or can be downloaded onto client side device 300 (e.g., from a radio station or a third-party provider). Suitable memory 325 and secondary storage device(s) 327 are operative to communicate with the microcontroller 315.

Figure 4A:
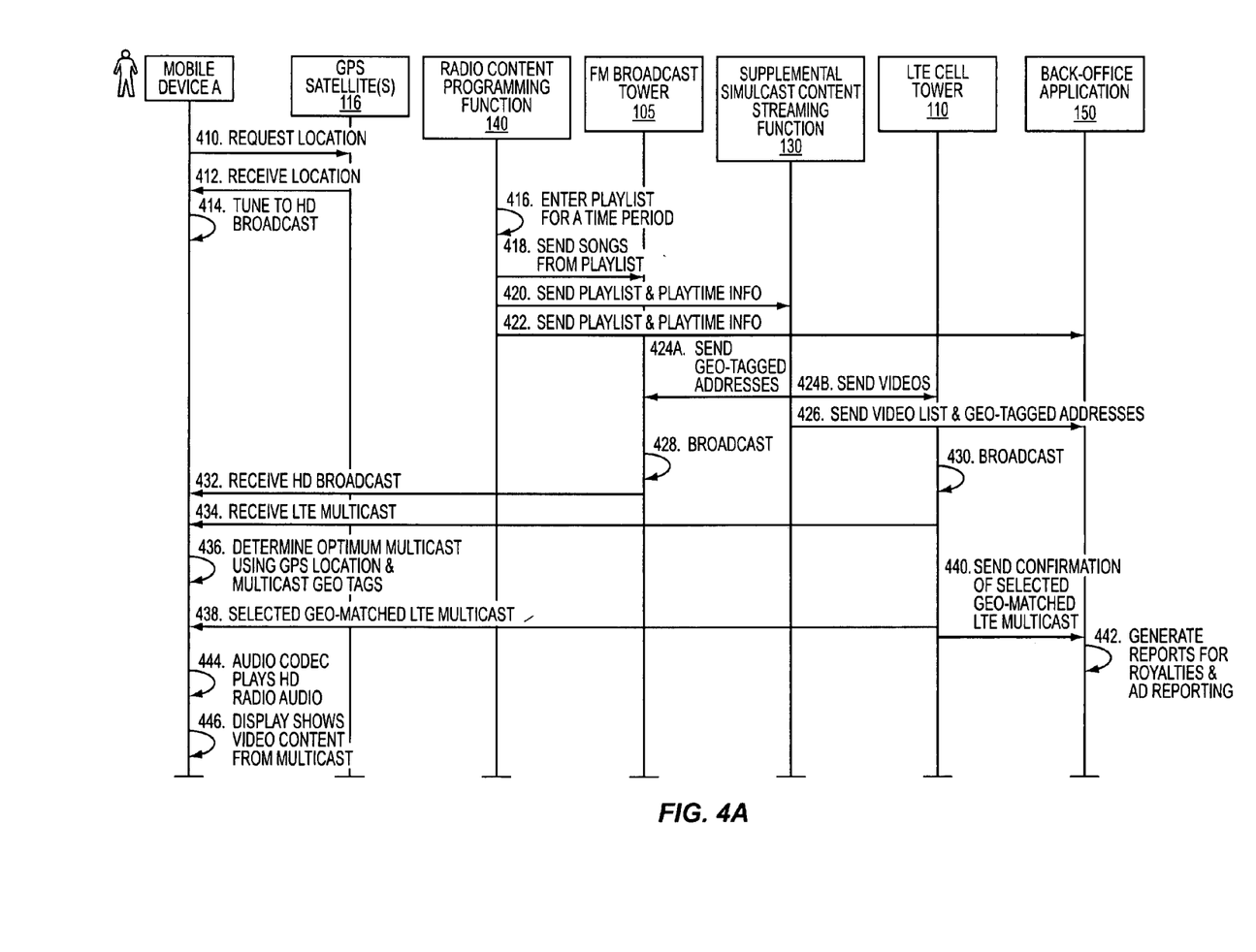
FIG. 4A depicts a sequence diagram according to an illustrative embodiment of the present disclosure.

FIG. 4A depicts a sequence diagram according to an illustrative embodiment of the present disclosure. More specifically, at steps 410 and 412, a Mobile Device A (which corresponds to dual radio client 115 in FIG. 1 and client side device 300 in FIG. 3) determines/refreshes its current location using GPS 116. At step 414, the user tunes the Mobile Device A to an HD radio station. At step 416, the radio content programming function 140 sets the playlist. At step 418, the radio content programming function 140 sends the songs from the playlist in real time to the FM Broadcast tower 105 of the HD radio station to be broadcast. At step 420 and 422, the radio content programming function 140 sends in advance the playlist and the time when the playlist will be played to the supplemental simulcast content streaming function 130 and the back office application 150. At steps 424A and 424B, the supplemental simulcast content streaming function 130 determines in advance which videos should be delivered along side of the HD radio content for each location in the HD radio station's range, and then sends the videos by location to the mobile access network cell tower 110 (shown in FIG. 4A as an LTE™ Cell Tower) for broadcast in real-time synchronization with the HD radio broadcast. At step 426, the supplemental simulcast content streaming function 130 also sends this list to the back office application 150. At step 428, the FM broadcast tower 105 broadcasts the content 106 of the HD radio station. At step 430, the mobile access network cell tower 110 broadcasts the multicast 118. This multicast 118 includes the geo-tags (location and IP address for the media (e.g., video) content) corresponding to the songs broadcast by the HD radio station. At step 432, the Mobile Device A receives the HD radio broadcast 106. At step 434, the Mobile Device A receives the multicast 118. At step 436, the GPS location of Mobile Device A and the locations in the multicast are compared to determine the optimum multicast for Mobile Device A to receive. At step 438, the Mobile Device A receives the multicast 118 specific for its location. Mobile Device A then in real time accesses the IP addresses from the specific multicast 118 for its location. This allows Mobile Device A to obtain the video content associated with the radio station. At step 440, the mobile access network cell tower 110 reports as at 151 to the back office application 150 which geographic specific multicast 118 has been joined by Mobile Device A. At step 442, the back office application 150 now knows the content being broadcast (from step 422), the video content (e.g., ads) being delivered in conjunction with that content (from step 426), and which users are listening to this station, based on the geographic-specific multicast 118 joined (step 440). The back office application 150 can then generate reports that show how many listeners have listened to particular songs (for royalty reporting) and how many listeners have received video content (here, ads) (for impression reporting) (step 442). At step 444, the Mobile Device A plays the songs from the HD radio station. At step 446, the display on Mobile Device A shows the geographic-specific media content associated with the HD radio station for its current location.

Figure 4B:
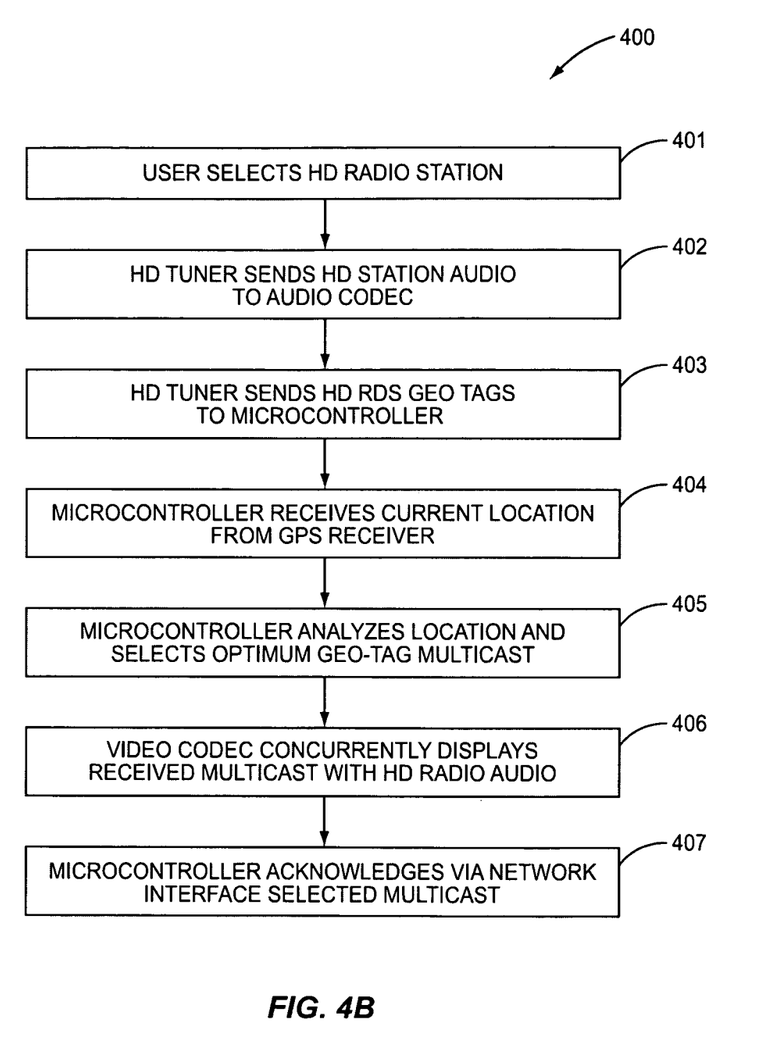
FIG. 4B depicts a process flow of a client device operation according to an illustrative embodiment of a method operating in the system of FIGS. 1-3.

FIG. 4B shows a process flow of a client device operation according to an illustrative embodiment of a method operating in the system of FIGS. 1-3. It should be understood that more or less steps may be included. For example, a simple process flow of the selection of an HD Radio station by the client side device (115, 300) is shown in FIG. 4B. In step 401, the user/listener selects a particular HD Radio FM station to which to listen. In step 402, the HD receiver/tuner 307 sends HD station audio programming to the audio codec & playback functions 313. The HD receiver/tuner 307 sends HD RDS geo-tags (i.e., RDS geo-tagged IP addresses) to the microcontroller 315 in step 403. In step 404, the microcontroller 315 receives the current location from the GPS receiver 311. The microcontroller 315 analyzes the location and selects the optimum geo-tag multicast in step 405. In step 406, the video codec 317 concurrently displays the received multicast on the video display 319 along with HD Radio audio at output 312. In step 407, the microcontroller 315 acknowledges via the network interface 309 the selected multicast. When a new song begins, the client side device may start with step 403 to select a new multicast based on an updated location. Alternatively, the client side device may just continue receiving based on its current location and monitor for exit from the currently RDS-identified locations at any time of the broadcast.

Example

Synchronized Broadcast and Simulcast of Media Content

Figure 5:
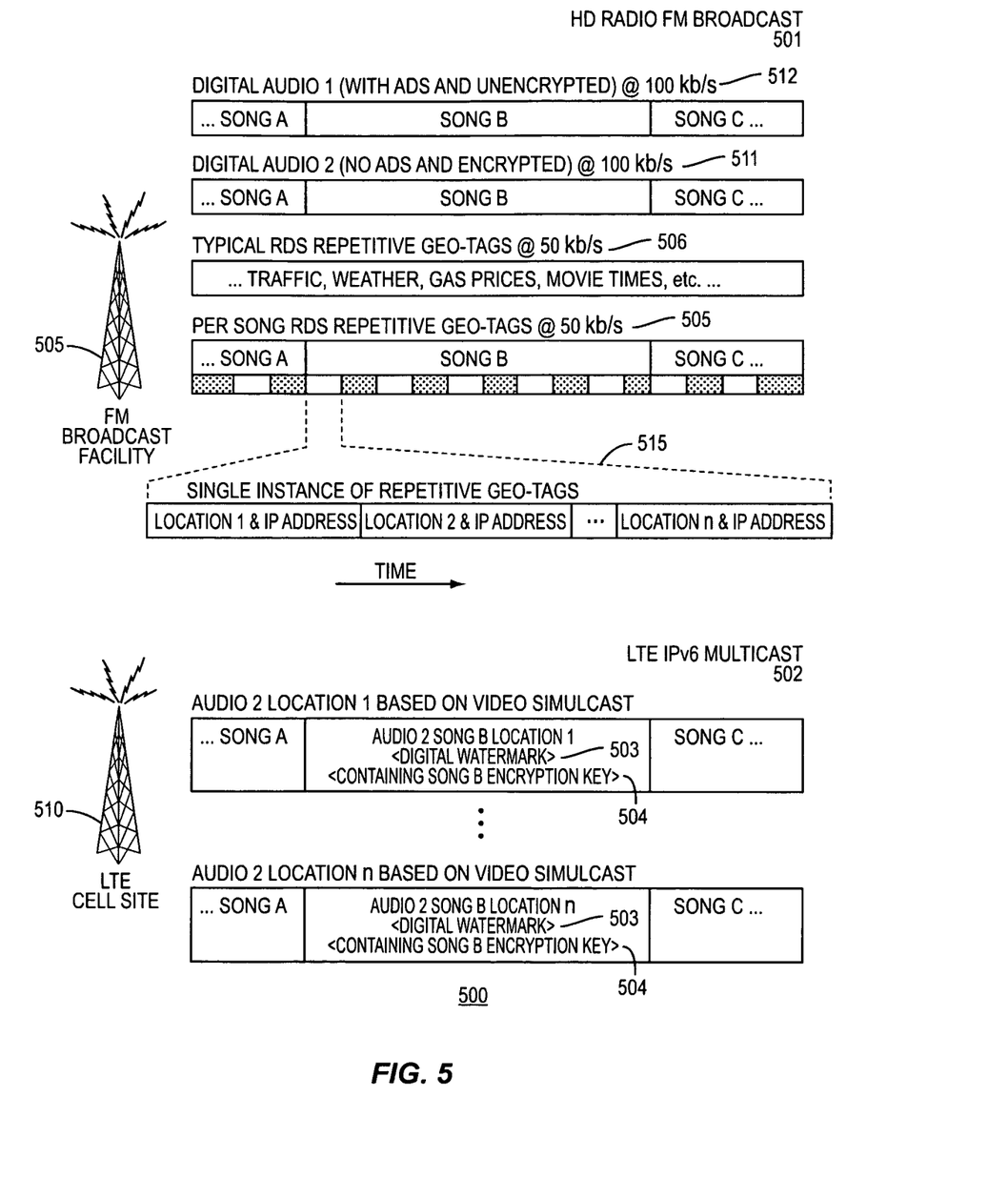
FIG. 5 depicts the transmit and wide area network (WAN) protocols for a dual audio HD Radio station according to an illustrative embodiment.

FIG. 5 shows a modified version of FIG. 2 to explain the Example, with like elements being designated with like reference numerals except with the prefix "5" instead of "2" or "1". With reference to FIG. 5, next generation mobile devices contain radio frequency (RF) interfaces with both WAN LTE™, and RF HD Radio including RDS. A single terrestrial FM broadcast station 505 offers HD Radio programming in both traditional audio ad format 512 and an alternate (audio ad-free) format using only video based ads 511 (similar to Internet radio). Utilizing a pure digital format on the broadcast carrier, the available 300 kbits/s is partitioned as follows:

- 100 kbits/s approximate CD quality unencrypted audio with in-line audio ads as at 512;
- 100 kbits/s approximate CD quality per song unique encrypted audio with no in-line ads as at 511;
- 50 kbits/s data containing geo-tags with multicast IP addresses for video ads as at 505; and
- 50 kbits/s other RDS type data services (traffic, weather, gas prices, etc.) as at 506.

In addition to the RF broadcast 501, the radio station streams video ads matched to the encrypted programming content 511 over the Internet such that LTE™ enabled mobile devices can receive the video ad while simultaneously listening to audio ad-free HD Radio. As described in connection with FIG. 2, the geo-tag sequence 505 repeats such that a client tuning to a station after the beginning of a song (e.g., songs A, B, C, . . . ) can quickly join the associated multicast 502. Each geo-tag 515 contains a point location or given area matched to an IPv6 multicast address (e.g., Location 1 & IP Address, Location 2 & IP Address, . . . . Location n & IP Address). The point location or given area may be defined as a single location with given radius, points of a polygon, or other area defining means. The IP address may be directly defined or indirectly defined using a URL (via HTTP). Again, differing Layer 4 through 7 protocol stack implementations may be used for delivering the video. The associated video streams available over the LTE™ network are time synchronized to the given song playing over the terrestrial broadcast (FIG. 5 again shows song B as an example).

Figure 6:
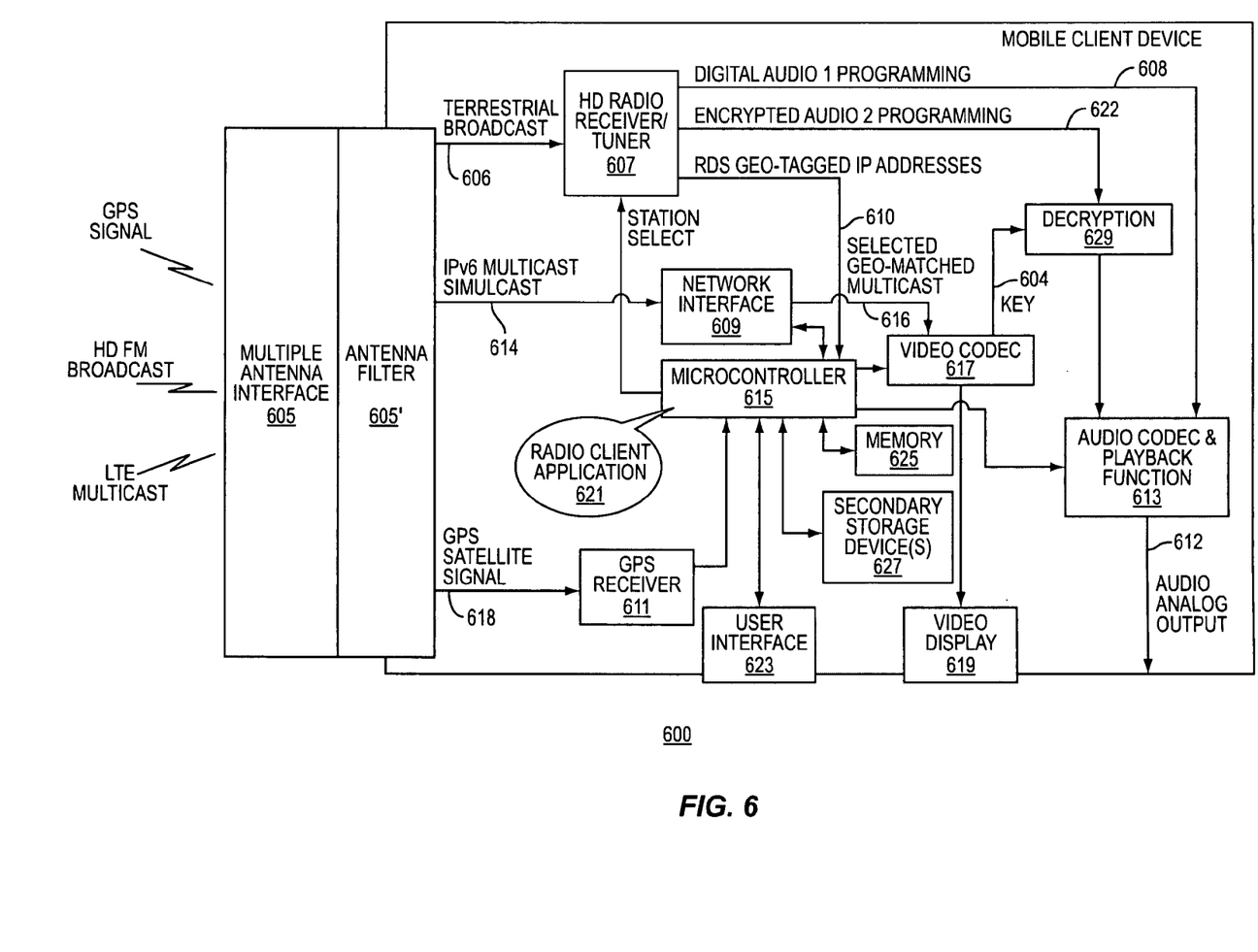
FIG. 6 depicts a block diagram of the basic functions of a client device for a dual audio HD Radio station according to an illustrative embodiment.

Contained within the video content is an invisible digital watermark 503 with a rotating encryption key 504 to be used to decrypt the current song playing (e.g., song B in FIG. 5) on the audio device. FIG. 6 shows a modified version of FIG. 3 to support this scenario, with like elements being designated with like reference numerals except with the prefix "6" instead of "3". As shown in FIG. 6, client devices 600 wishing to receive audio ad-free radio have the ability to receive both audio streams and circuitry or software within the video codec 617 to retrieve the decryption key 604. This key 604 is then used by the decryption function 629 to allow playback of the encrypted audio 2 programming 622. Once decryption is enabled and the video ad is displayed by the video display 619, an acknowledgment is returned (see, for example, acknowledgement 119 in FIG. 1).

The present invention has substantial opportunity for variation without departing from the spirit or scope of the present invention. For example, while the embodiments discussed herein are directed to video multicast examples, the present invention is not limited thereto. For example, the video multicast model described previously may be replaced with an audio multicast solution. Geo-tags are used such that the client device can join a multicast audio stream based on location of the listener. For example, an audio stream would have replacement content (e.g., an ad) to overwrite generic content contained on the radio frequency (RF) broadcast. The multicast audio content would be time synchronized with the RF audio content and would appear seamless to the listener when over-inserted on the client device.

Moreover, scalable video content may be used on the video multicast to allow efficient spectrum use for clients of varying display capability. Basically, playback devices with higher screen resolutions would use enhancement layers when displaying video content for HD Radio stations. When joining an enhancement layer, an advertiser may be billed a premium by the radio station for delivering a higher resolution ad. The acknowledgment from the client device would indicate this to the back-office systems.

Still further, while the examples refer to audio/video content, the present invention is not limited thereto and other forms of media content are contemplated herein.

Those skilled in the art will recognize improvements and modifications to the preferred embodiments of the present invention. All such improvements and modifications are considered within the scope of the concepts disclosed herein and the claims that follow.

What is claimed is:

1. A method of receiving a radio broadcast and simulcast of media content, comprising:
    receiving a digital radio broadcast comprising digital radio content over a terrestrial radio broadcast spectrum, wherein the digital radio broadcast comprises an associated radio data system (RDS) functionality, and wherein an RDS channel of the digital radio broadcast includes geo-tagged Internet Protocol version 6 (IPv6) multicast addresses that identify streams of media content available separately over a multicast network;
    receiving media content separately over the multicast network from a multicast selected based on a match of the RDS geo-tagged IPv6 multicast addresses to a current global positioning system (GPS) location of the client device;
    time synchronizing the media content to the digital radio broadcast; and
    presenting the time synchronized media content and the digital radio content for playback by a client device.

2. The method of claim 1, wherein the media content comprises one of a video multicast or an audio multicast.

3. The method of claim 1, wherein the digital radio broadcast comprises an HD Radio broadcast.

4. The method of claim 1, wherein the multicast network comprises a Long Term Evolution (LTE) network.

5. The method of claim 4, wherein the LTE network comprises an Internet Protocol version 6 (IPv6) LTE network.

6. The method of claim 1, wherein the multicast network comprises a Worldwide Interoperability for Microwave Access (WiMAX) network.

7. The method of claim 6, wherein the WiMAX network comprises an Internet Protocol version 6 (IPv6) WiMAX network.

8. The method of claim 1, wherein the media content comprises a video advertisement which is matched to a particular digital radio broadcast.

9. The method of claim 1, wherein the client device comprises one of a smart phone, a laptop computer, a personal computer (PC), or a digital audio player with Internet capability.

10. The method of claim 1, wherein the client device is configured to be integrated with an automobile entertainment system.

11. A system for providing synchronized broadcast and simulcast of media content, comprising:
    a frequency modulation (FM) transmitter configured to transmit a digital radio broadcast comprising digital radio content over a terrestrial radio broadcast spectrum, wherein the digital radio broadcast comprises an associated radio data system (RDS) functionality, and wherein an RDS channel of the digital radio broadcast includes geo-tagged Internet Protocol version 6 (IPv6) multicast addresses that identify streams of media content available separately over a multicast network;
    a simulcast content streaming function configured to transmit media content separately over the multicast network, wherein the simulcast content streaming function provides multicast Internet Protocol (IP) addresses for each item of media content to a radio data system (RDS) channel of the digital radio broadcast;
    a microcontroller configured to time synchronize the media content to the digital radio broadcast; and
    a media codec configured to present the time synchronized media content and the digital radio content for playback by a client device.

12. The system of claim 11, wherein the media content comprises a video advertisement which is matched to a particular digital radio broadcast.

13. The system of claim 11, wherein the digital radio broadcast comprises an HD Radio broadcast.

14. The system of claim 11, wherein the multicast network comprises a Long Term Evolution (LTE) network.

15. The system of claim 11, wherein the multicast network comprises a Worldwide Interoperability for Microwave Access (WiMAX) network.

16. A non-transitory, computer readable medium comprising a program for instructing a client device to:
receive a digital radio broadcast comprising digital radio content over a terrestrial radio broadcast spectrum, wherein the digital radio broadcast comprises an associated radio data system (RDS) functionality, and wherein an RDS channel of the digital radio broadcast includes geo-tagged Internet Protocol version 6 (IPv6) multicast addresses that identify streams of media content available separately over a multicast network;
receive media content separately over the multicast network from a multicast selected based on a match of the RDS geo-tagged IPv6 multicast addresses to a current global positioning system (GPS) location of the client device;
time synchronize the media content to the digital radio broadcast; and
present the time synchronized media content and the digital radio content for playback.

17. A method of operating a client device, comprising:
receiving a digital radio broadcast from a terrestrial radio station along with an associated radio data system (RDS) functionality;
receiving media content separately over a multicast network;
receiving multicast Internet Protocol (IP) addresses matched to a geo-tag for each item of the media content from an RDS channel of the digital radio broadcast, the multicast Internet Protocol (IP) addresses identifying streams of media content available separately over a multicast network;
receiving at least one global positioning system signal for providing location coordinates to identify a current location of the client device;
analyzing the current location and selecting an optimum multicast available separately over the multicast network based on the geo-tagged IP address of the selected multicast; and
concurrently displaying the media content of the selected multicast together with playback of the digital radio broadcast on the client device.

18. The method of claim 17, wherein audio content of the digital radio broadcast from the terrestrial radio station is encrypted, the method further comprising extracting an encryption key from the selected multicast to decrypt the audio content for playback together with the media content by the client device.

19. The method of claim 18, further comprising using a watermark to deliver the encryption key in the selected multicast.

20. The method of claim 18, wherein once decryption is enabled and the media content is displayed by the client device, the method further comprising returning an acknowledgement confirming that the selected multicast was joined.

21. A client device comprising a controller configured to:
receive a digital radio broadcast from a terrestrial radio station along with an associated radio data system (RDS) functionality;
receive media content separately over a multicast network;
receive multicast Internet Protocol (IP) addresses matched to a geo-tag for each item of the media content from an RDS channel of the digital radio broadcast, the multicast Internet Protocol (IP) addresses identifying streams of media content available separately over a multicast network;
receive at least one global positioning system signal for providing location coordinates to identify a current location of the client device;
analyze the current location and select an optimum multicast based on the geo-tagged Internet Protocol (IP) address of the selected multicast; and
concurrently display the media content of the selected multicast together with playback of the digital radio broadcast on the client device.

22. The method of claim 1, wherein each of the streams providing media content correspond to an area within a terrestrial radio broadcast geographic area served by the digital radio broadcast.

23. The method of claim 22, comprising:
determining a current location of the client device; and
selecting, for receiving the media content separately over the multicast network, a stream of the each of the streams providing media content based on a correspondence of the determined current location with the selected stream's corresponding area within the terrestrial radio broadcast geographic area served by the digital radio broadcast.

24. The system of claim 12, wherein each of the streams providing media content correspond to an area within a terrestrial radio broadcast geographic area served by the digital radio broadcast.

25. The method of claim 17, wherein each of the streams providing media content correspond to an area within a terrestrial radio broadcast geographic area served by the digital radio broadcast.

26. The method of claim 25, wherein selecting an optimum multicast includes selecting a stream of the each of the streams providing media content based on a correspondence of the current location with the selected stream's corresponding area within the terrestrial radio broadcast geographic area served by the digital radio broadcast.

27. The client device of claim 21, wherein each of the streams providing media content correspond to an area within a terrestrial radio broadcast geographic area served by the digital radio broadcast.

28. The client device of claim 25, wherein selecting an optimum multicast includes selecting a stream of the each of the streams providing media content based on a correspondence of the current location with the selected stream's corresponding area within the terrestrial radio broadcast geographic area served by the digital radio broadcast.

29. A client device comprising a controller configured to:
receiving a digital radio broadcast comprising digital radio content over a terrestrial radio broadcast spectrum, wherein the digital radio broadcast comprises an associated radio data system (RDS) functionality, and wherein an RDS channel of the digital radio broadcast includes geo-tagged Internet Protocol version 6 (IPv6) multicast addresses that identify streams of media content available separately over a multicast network;
receiving media content separately over the multicast network from a multicast selected based on a match of the RDS geo-tagged IPv6 multicast addresses to a current global positioning system (GPS) location of the client device;
time synchronizing the media content to the digital radio broadcast; and
presenting the time synchronized media content and the digital radio content for playback by a client device.

30. The client device of claim 29, wherein each of the streams providing media content correspond to an area within a terrestrial radio broadcast geographic area served by the digital radio broadcast.

31. The client device of claim 30, wherein the controller is further configured to:
- determine a current location of the client device; and
- select, for receiving the media content separately over the multicast network, a stream of the each of the streams providing media content based on a correspondence of the determined current location with the selected stream's corresponding area within the terrestrial radio broadcast geographic area served by the digital radio broadcast.

* * * * *